United States Patent [19]

Bernheim et al.

[11] Patent Number: 5,393,859
[45] Date of Patent: Feb. 28, 1995

[54] ORGANOPOLYSILOXANES CONTAINING SUBSTITUTED 1,3,5-TRIAZINE UNITS

[75] Inventors: Michael Bernheim, Aystetten; Harald Chrobaczek, Augsburg; Michael Messner, Diedorf-Hausen, all of Germany

[73] Assignee: Ciba-Geigy Corporation, Ardsley, N.Y.

[21] Appl. No.: 252,728

[22] Filed: Jun. 2, 1994

[30] Foreign Application Priority Data

Jun. 7, 1993 [DE] Germany ............... 4318794

[51] Int. Cl.$^6$ ............... C08G 77/40
[52] U.S. Cl. ............... 528/27; 528/38; 544/204
[58] Field of Search ............... 528/27, 38; 544/190, 544/204

[56] References Cited

U.S. PATENT DOCUMENTS

| | | | |
|---|---|---|---|
| 3,884,875 | 5/1975 | Kim et al. | 528/27 |
| 4,113,947 | 9/1978 | Deider | 544/196 |
| 4,620,878 | 11/1986 | Gee | 106/287 |
| 4,680,366 | 7/1987 | Tanaka et al. | 528/38 |
| 4,874,662 | 10/1989 | Huhn | 428/266 |
| 5,118,535 | 6/1992 | Cray | 427/387 |

FOREIGN PATENT DOCUMENTS

| | | | |
|---|---|---|---|
| 0906544 | 9/1962 | United Kingdom | 528/27 |
| 0923584 | 4/1963 | United Kingdom | 528/27 |
| 1051938 | 12/1966 | United Kingdom | |

*Primary Examiner*—Robert E. Sellers
*Attorney, Agent, or Firm*—Kevin T. Mansfield

[57] ABSTRACT

Organopolysiloxanes in which two polysiloxane chains are bonded via a divalent radical can be obtained by reaction of cyanuric halides with organopolysiloxanes which contain primary amino groups in substituents. The divalent radical contains 1,3,5-triazine rings, to which a halogen atom is still bonded. The organopolysiloxanes thus obtained are suitable for soft handle treatment of fiber materials. In particular, textile sheet-like structures which comprise cellulose fibers can thereby be given a soft handle and improved permanence of the treatment effects with respect to washing processes.

3 Claims, No Drawings

ORGANOPOLYSILOXANES CONTAINING SUBSTITUTED 1,3,5-TRIAZINE UNITS

The invention relates to organopolysiloxanes which contain substituted 1,3,5-triazine units, a process for the preparation of such siloxanes and their use for the treatment of fiber materials.

The use of reaction products of organopolysiloxanes and cyanuric halides for treatment of masonry and building materials is described in GB-B 1 05 1 938.

Treatment of fiber materials, such as, for example, textile sheet-like structures in the form of woven fabrics, with organopolysiloxanes which contain primary and/or secondary amino groups is known. Thus, for example, DE-A 24 11 326 and U.S. Pat. No. 5,057,572 describe the treatment of textiles with organopolysiloxanes containing amino groups. The purpose of this treatment is to impart to the textile materials a soft handle.

However, in addition to advantages, the organopolysiloxanes described in the DE and US specification mentioned also have disadvantages. Thus, for example, the permanence of the effects achieved with the silicones is not optimum after washing processes. If a relatively high content of primary amino groups is present on the treated textiles, an undesirable tendency to yellow may furthermore occur. In addition, difficulties may occur if the organopolysiloxanes mentioned in the above specifications are to be converted into stable aqueous dispersions, especially if these siloxanes have relatively high viscosities. On the other hand, however, stable aqueous dispersions of the siloxanes are desirable, because the siloxanes are preferably employed in the form of aqueous dispersions for treatment of fiber materials for cost and environmental reasons.

The object of the present invention was to provide organopolysiloxanes which are suitable for the treatment of fiber materials, in particular textile sheet-like structures. After washing processes, the permanence of the effects achieved, especially on materials which contain cellulose fibers or polyamide fibers, should be better than in the case where known amino-functional organopolysiloxanes are used. The handle and the yellowing tendency of treated fiber materials should not be worse than when known amino-functional organopolysiloxanes are used, and it should be possible for the organopolysiloxanes to be developed also to be obtained in the form Of stable aqueous dispersions when these siloxanes have relatively high viscosities.

The object mentioned has been achieved by organopolysiloxanes having the structure

*A-E-A* in which E represents a divalent radical of the general formula (I)

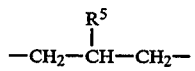
(I)

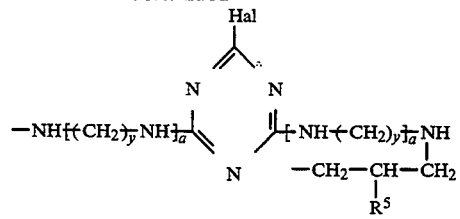

in which Hal represents Cl or F, y is in each case a number from 2 to 4 and a is in each case 0 or 1, in which the radicals A independently of one another represent a monovalent radical of the general formula (II)

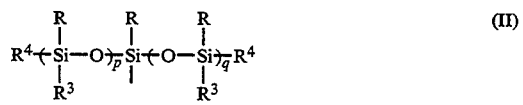

in which p is a number from 0 to 800, q is a number from 0 to 800 and p+q is a number from 15 to 800, preferably 50 to 250, in which all the radicals $R^3$ present indendently of one another in each case represent a radical R or -E-A or

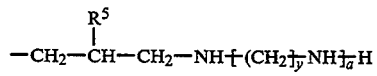

or

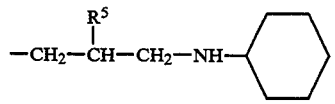

or

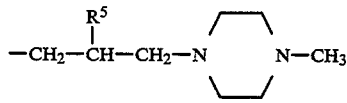

or

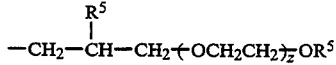

in which z is a number from 5 to 25, in which all the radicals R independently of one another represent an alkyl radical having 1 to 4 C atoms or the phenyl radical, $R^4$ represents —OSiR$_2$R$^1$ or R, in which $R^1$ represents R, OR or OH, and in which all the radicals $R^5$ present independently of one another represent H or CH$_3$.

The above organopolysiloxanes according to the invention lead to a pleasantly soft handle of the textile sheet-like structures, such as, for example, woven fabrics, mesh goods or non-wovens, treated with them. The permanence Of the effects with respect to washing processes is excellent, especially in the case of textiles which contain cellulose fibers or are made of cellulose fibers. This may lie in the fact that, during treatment and subsequent drying of the materials containing cellulose, especially if alkaline conditions exist, chlorine or fluorine atoms which are present in the siloxanes according to the invention are replaced, a chemical bond to the cellulose molecule being formed. The tendency of fiber materials which have been treated with organopolysiloxanes according to the invention to yellow can be adjusted to a very low level by keeping the number of free primary amino groups in the organopolysiloxanes low. The handle of the treated textiles is comparable to that which results when known amino-functional polysiloxanes are used. It is possible to obtain stable aqueous dispersions of siloxanes according to the invention, even though the viscosities of these siloxanes assume values greater than about 400 mPa.s. In contrast, problems in respect of stability of the dispersions often occur with conventional amino-functional polysiloxanes, at least during certain homogenization processes, if this value of 400 mPa.s is exceeded.

The organopolysiloxanes according to the invention contain two monovalent polysiloxane radicals A bonded to one another via a divalent unit E. The divalent radical E is a unit of the formula (I)

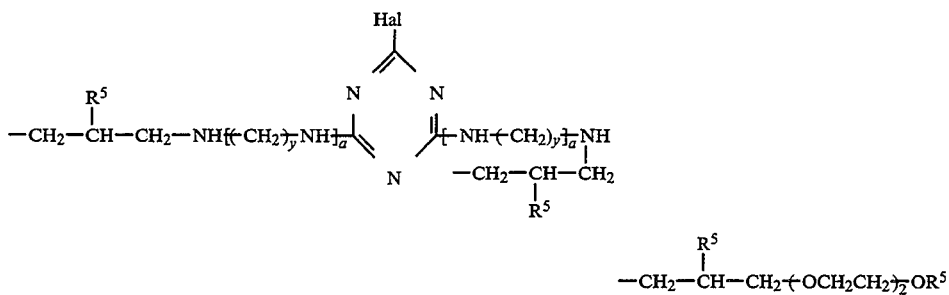

The 1,3,5-triazine unit contained therein contains a chlorine or fluorine atom bonded to the ring, which is designated by "Hal" in the formula (I). Hal preferably represents a chlorine atom. The value of y is in each case 2 to 4. The value of y can be the same in all the —$(CH_2)_y$— groups present, but the individual values of y can also differ from one another. In a preferred embodiment of organopolysiloxanes according to the invention, the value of y is in each case 2 for some or all of the —$(CH_2)_y$— groups present. This also applies to the case illustrated below, where the organopolysiloxanes according to the invention contain several units E, i.e. if one or more of the radicals $R^3$ represents -E-A. In each of the two radicals bonded to the 1,3,5-triazine ring, the unit E can contain one or two nitrogen atoms, i.e. the value of a can be 0 or 1 independently of one another in each of these radicals. Preferably, a in all the units E present has the value 0.

The two organopolysiloxane radicals A bonded to the unit E can have the same or a different structure. Each radical A is a monovalent radical of the formula (II)

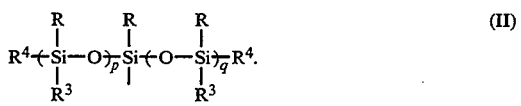

(II)

The central Si atom of this formula (II), i.e. the Si atom present between the groupings $+Si(R)(R^3)O+_p$ and $+O(R)(R^3)Si+_q$, is bonded to the unit E. In the formula (II), the index p can have a value from 0 to 800 and q has a value from 0 to 800. The sum of p+q has a value of 15 to 800, preferably 50 to 250. All the radicals $R^3$ present represent either a group -E-A, a radical of the formula

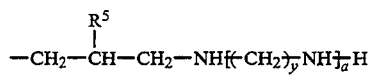

or a radical R of the type described in more detail below, or one of the following radicals

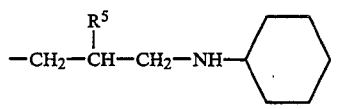

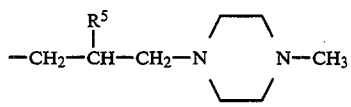

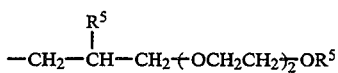

in which z is a number from 5 to 25.

If one or more of the radicals $R^3$ represent the group -E-A (where E and A have the abovementioned meaning), several 1,3,5-triazine units are present in the organopolysiloxanes according to the invention. This can be the case, for example, if the siloxanes are prepared by the process described below and polysiloxanes which contain several substituents with primary amino groups are used as starting compounds here. If these polysiloxanes which contain several radicals having the structure

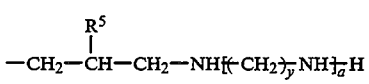

bonded to Si atoms are reacted with cyanuric chloride or cyanuric fluoride by the process described below in more detail, organopolysiloxanes according to the invention in which $R^3$ represents -E-A can be formed. If this reaction takes place in ratios of amounts such that not all the primary amino groups present react with cyanuric chloride or cyanuric fluoride, organopolysiloxanes according to the invention in which one or more of the radicals $R^3$ represent the formula

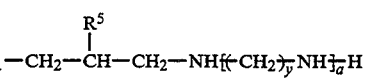

can be obtained.

In a preferred embodiment of the organopolysiloxanes according to the invention, 80 to 100% of all the radicals $R^3$ present represent a radical R of the type described below. This means that in this case the siloxanes contain no primary amino groups or only a small number of primary amino groups, which has favorable effects on the tendency of fiber materials treated with the siloxanes to yellow. If none of the radicals $R^3$ represents the unit -E-A, the polysiloxanes according to the invention contain only a single 1,3,5-triazine ring.

Some or all of the radicals $R^3$ present in the polysiloxanes according to the invention can represent one of the following radicals:

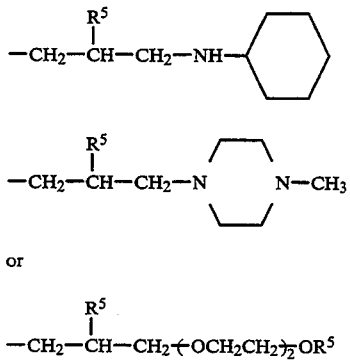

or $$-CH_2-\overset{R^5}{\underset{|}{CH}}-CH_2+OCH_2CH_2\overline{)_z}OR^5$$

in which z and $R^5$ have the meanings already mentioned. A particularly soft handle of fiber materials treated with the polysiloxanes coupled with a high permanence after washing processes can be achieved by the presence of the N-cyclohexyl or N-methyl-piperazinyl groups mentioned. By the presence of polyoxyethylene groups, the polysiloxanes can be convened into aqueous dispersions with smaller amounts of dispersing agent than in the absence of polyoxyethylene groups.

All the radicals R present in the polysiloxanes according to the invention independently of one another represent the phenyl radical or a saturated, branched or unbranched alkyl radical having 1 to 4 carbon atoms. Those siloxanes in which all the radicals R present are methyl radicals are preferred. These preferred organopolysiloxanes are particularly suitable for the treatment of fiber materials.

All the radicals $R^5$ mentioned in the abovementioned formulae independently of one another represent hydrogen or the methyl group.

According to the abovementioned formula (II), the radicals A present in the organopolysiloxanes according to the invention in each case contain two radicals $R^4$ on the particular ends of the polysiloxane chains. All these radicals $R^4$ independently of one another represent a radical R of the type described above or a radical —O—SiR$_2$R$^1$; these radicals —OSiR$_2$R$^1$ contain two radicals R of the type mentioned and one radical $R^1$. All the radicals $R^1$ present independently of one another represent a radical R, a radical OR or a hydroxyl group.

From the above explanations, it can be seen that in the organopolysiloxanes according to the invention, units E either can be bonded to the ends of the polysiloxane chains A (for example if, in formula (II), $R^4$=R, p=0, q≠0, $R^3$=-E-A ), or can be present as side chains (for example if $R^4$=OSiR$_2$R$^1$). The latter case, in which the unit E represents a side chain of the two radicals A, is preferred. That is to say, a preferred embodiment of the polysiloxanes according to the invention comprises those in which p is not 0 (or q is not 0) at the same time as $R^4$ is R.

Organopolysiloxanes according to the invention can be obtained by reacting an organopolysiloxane which contains substituents with primary amino groups with a compound of the formula (III)

In this formula, the 3 substituents designated "Hal" independently of one another in each case represent a chlorine atom or a fluorine atom. Cyanuric fluoride, for example, is suitable as the compound (III). Cyanuric chloride is particularly preferred as the starting compound. If cyanuric chloride is used as the starting compound, the organopolysiloxanes according to the invention obtained by the process described below contain one or more 1,3,5-triazine units, a chlorine atom being bonded to each of these units.

The organopolysiloxane which can be used as the starting compound for the preparation of polysiloxanes according to the invention is a compound or a mixture of compounds of the formula (IV)

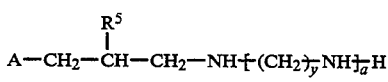

In this formula, A, $R^5$, y and a have the abovementioned meanings, with the restriction that none of the radicals $R^3$ present in A represent the group -E-A.

Suitable organopolysiloxanes of the formula (IV) are commercially obtainable. Examples of suitable representatives are the products "DC-softener SSF" (Dow Coming) and Q2-8166 (Dow Coming). Suitable amino-functional polysiloxanes of the formula (IV) furthermore are described in EP-A 138 192 and in U.S. Pat. No. 5,057,572. Information on their preparation is also to be found them.

Starting compounds of the formula (IV) in which radicals $R^3$ which contain the abovementioned N-cyclohexyl or N-methylpiperazinyl radicals or polyoxyethylene units are present can be prepared in accordance with information from the literature on silicone chemistry, for example by an equilibration reaction, in which mixtures of corresponding functional silanes or siloxanes and hexamethylcyclotrisiloxane or octamethylcyclotetrasiloxane are used as starting substances. The preparation of polysiloxanes containing N-cyclohexyl groups is described in DE-A 37 30 413 and the preparation of polysiloxanes containing N-piperazinyl radicals is described in EP-A 44 1 530. Polysiloxanes which contain substituents with polyoxyethylene units and substituents with primary amino groups are described in the German patent application with the file number P 42 22 485 (date of application 09.07.1992). The equilibration reaction mentioned can accordingly be carried out starting from an oligocyclosiloxane, a functional silane of the formula

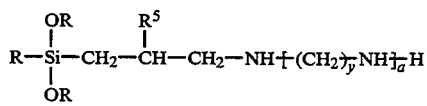

and a silane or polysiloxane which contains a substituent of the formula

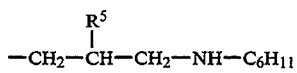

($C_6H_{11}$ = cyclohexyl radical), of the formula

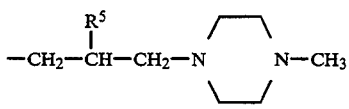

or of the formula

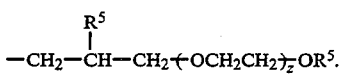

The process according to the invention is described in more detail below by the example of the particularly preferred use of cyanuric chloride as the starting compound of the formula (III).

It is known from the chemical literature that replacement of the individual chlorine atoms of cyanuric chloride can be controlled by the reaction temperature. Nucleophilic replacement of the first Cl atom already takes place at about 0° C. The second chlorine atom is replaced at room temperature, while a temperature of about 100° C. is necessary for replacement of the third Cl atom.

For this reason, the process according to the invention is carried out overall at a temperature in the range from −10° C. to +70° C. A preferred embodiment of the process comprises maintaining a temperature in the range from 0° C. to 35° C. throughout the entire reaction. Since two of the three chlorine atoms of the cyanuric chloride must be replaced by amino groups in the process, the process must of course be carried out such that a temperature at which this takes place is reached. This temperature which must be reached at least also depends on the starting compounds employed. In the normal case, a temperature of −10° C. or 0° C. is not sufficient to effect the replacement of two chlorine atoms. In this case, although a temperature at the lower limit of the range stated (−10° C. or 0° C.) can be present at the start of the reaction, the temperature must then be increased in the course of the reaction. A temperature of 70° C. should not be exceeded, since there is the risk of all three chlorine atoms already being replaced at temperatures higher than 70° C. In the normal case, it is sufficient if a temperature of 35° C. is not exceeded during the reaction. It may be advantageous to set a low temperature of, for example, −10° C. or preferably about 0° C. at the start of the reaction and to increase the temperature, for example up to 70° C., preferably up to 35° C., in the course of the reaction. If it is desirable to carry out the entire reaction at a constant temperature, this should be chosen such that the main product of the reaction contains a triazine ring in which two chlorine atoms are replaced by amino groups. This constant temperature is expediently in the range from 15° C. to 35° C.

The amounts of starting compounds for the reaction of cyanuric chloride with an organopolysiloxane or a mixture of organopolysiloxanes of the formula (IV) are expediently chosen such that 0.9 to 1.1 mol of cyanuric chloride are employed per 2 mol of primary amino groups of the siloxane of the formula (IV). That is to say, preferably, t×0.45 to t×0.55 mol of cyanuric chloride are used per tool of the compound (IV), where t is the number of primary amino groups in the siloxane of the formula (IV). It is particularly advantageous if t×0.5 tool of cyanuric chloride, that is to say an amount stoichiometrically equivalent for two replacements on the triazine ring, is employed per mole of the compound (IV). In this case, both the content of free cyanuric chloride and the content of primary amino groups in the reaction product are very low.

In a preferred embodiment of the process, the reaction mentioned is carried out such that an aqueous dispersion of the organopolysiloxane is used as one of the starting compounds. This is advantageous because, when the reaction with cyanuric chloride has ended, an aqueous dispersion of an organopolysiloxane according to the invention is present as the reaction product. This can be used for treatment of fiber materials either directly, if appropriate after dilution with water and removal of any organic solvent present by distillation, or after addition of further products. Further products which are known and suitable for the treatment of fiber materials, such as, for example, flameproofing agents, dispersions of modified polyethylene waxes, cellulose crosslinking agents and the like, can be added. Furthermore, additions of inorganic bases are possible, in order to obtain dispersions of polysiloxanes according to the invention which have an alkaline pH. These alkaline dispersions are advantageous because a chemical reaction with the fiber material, for example with cellulosic OH groups, can take place on treatment of the fiber materials with these dispersions and subsequent drying. The chlorine atom still bonded to the triazine ring is in this case replaced, and a very good permanence of the treatment with respect to washing processes is achieved because of the chemical bond to the cellulose molecule.

Aqueous dispersions of siloxanes of the formula (IV) are thus preferably employed as starting substances. Stable aqueous dispersions of the corresponding amino-functional polysiloxanes are commercially obtainable or can be prepared from the pure polysiloxanes of the formula (IV) with the aid of generally known dispersing agents or mixtures of dispersing agents. Particularly suitable dispersing agents are commercially available nonionic emulsifiers, such as, for example, ethoxylated fatty alcohols. The aqueous polysiloxane dispersions which are suitable as starting substances expediently comprise about 10 to 60% by weight of siloxane or siloxane mixture of the formula (IV) and 1 to 7% by weight of dispersing agent or dispersing agent mixture. The remainder is water.

The product of the formula (III) used for the reaction; preferably cyanuric chloride, is expediently used in the form of a solution of cyanuric chloride in an organic solvent. Suitable solvents are, for example, diethyl ether, ethyl acetate, toluene or xylene. These solutions preferably comprise 1 to 15% by weight of cyanuric chloride, and are combined with the aqueous dispersion of the organopolysiloxane, if appropriate in portions or by dropwise addition. When the reaction has ended, in the normal case, the organic solvent is removed, for example by distillation. A stable aqueous dispersion of an organopolysiloxane according to the invention is thus obtained.

The organopolysiloxanes according to the invention are particularly suitable for treatment of fiber materials, in particular textile sheet-like structures, such as woven fabrics, mesh goods or non-woven sheet-like structures (non-wovens). The polysiloxanes are preferably used for treatment of textile sheet-like structures which are made of cellulose fibers or polyamide fibers to the extent of 100% or comprise these fibers mixed with other fibers, for example textile sheet-like structures which comprise cellulose fibers and polyester fibers.

The organopolysiloxanes according to the invention are preferably employed for this purpose in the form of aqueous dispersions which, in addition to polysiloxane, dispersing agent and water, can also contain other constituents which have already been mentioned above. In particular, the addition of bases to establish an alkaline pH, for example between 7.5 and 10, is often of advantage. The aqueous dispersions can be employed, for example, for a padding process; the concentrations expediently to be established for this purpose are known to the expert.

In addition to the use mentioned in the form of aqueous dispersions for padding, the organopolysiloxanes according to the invention can also be used for coatings on sheet-like structures of fiber materials. In this case, they can be in the form of pastes containing water, which also comprise, in addition to the polysiloxane and water, a thickener, such as, for example, carboxymethylcellulose, polyvinyl alcohol or polyacrylic acid. These pastes furthermore can also comprise one or more crosslinking agents which is bifunctional and reacts with the chlorine or fluorine atom(s) present in the polysiloxane. Suitable crosslinking agents are aliphatic diamines or polyamines. The corresponding paste is applied to the textile sheet-like structure, for example via doctor blades, and a crosslinking reaction takes place during drying.

The invention will now be illustrated by embodiment examples.

EXAMPLE 1

(Preparation of a polysiloxane according to the invention)

25 parts by weight of an amino-functional polysiloxane having the following structure

where X = $\mathrm{+CH_2\mathrm{)}_3 NH_2}$, which has a viscosity of about 350 mPa.s at 25° C., were dispersed in 72 parts by weight of water with the aid of 3 parts by weight of an ethoxylated fatty alcohol as the dispersing agent. The dispersing agent contained on average about 10 to 12 C atoms in the alcohol component and about 6 oxyethylene units, and the dispersing operation was carried out in the form of a high pressure emulsification. A solution of about 0.22 pan by weight of cyanuric chloride in about 2 pans by weight of diethyl ether was added in portions to the resulting dispersion. The amounts of polysiloxane and cyanuric chloride here were calculated stoichiometrically such that ½ mol of cyanuric chloride was present per mol of primary amino groups. At the start of the reaction and until the end of complete addition of the cyanuric chloride solution, the temperature was about 0° C. The temperature was then increased to room temperature and the diethyl ether was then distilled off completely at room temperature under reduced pressure. A stable aqueous dispersion was obtained.

EXAMPLE 2

(Preparation of the polysiloxane according to the invention)

A solution of about 0.9 part by weight of cyanuric chloride in 8.5 pans by weight of xylene was added to a dispersion of 6.5 pans by weight of a polysiloxane having the structure

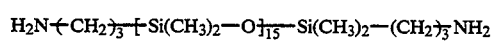

in about 37 pans by weight of water. The amounts of dispersion and cyanuric chloride solution were calculated such that 1 mol of cyanuric chloride (calculated as the solid) corresponded to 2 mol of amino groups. The dispersion of the polysiloxane was combined with the cyanuric chloride solution at a temperature of 0° C. The reaction mixture was kept at 0° C. for 20 minutes and then brought to room temperature. After 1 hour at room temperature, both the xylene and the polysiloxane according to the invention formed were removed from the mixture by extraction by shaking with petroleum ether. After the petroleum ether had been distilled off, a solution of the polysiloxane in the xylene was obtained. Analyses on the polysiloxane showed that it had a structure according to claim 1. An essentially xylene-free aqueous dispersion could be obtained by dispersing this solution containing xylene and polysiloxane in water (ethoxylated fatty alcohol as the dispersing agent) and subsequent removal of the xylene by azeotropic distillation.

EXAMPLE 3

(Treatment of fiber material)

A dispersion, obtained according to Example 1, of a polysiloxane according to the invention was diluted with water such that the dispersion thereby obtained contained about 15 g/l of the polysiloxane. This dispersion was brought to a pH of about 9 by addition of Na$_2$CO$_3$. An undyed woven fabric of 100% cotton was treated by means of padding and dried at 120° C.

COMPARISON EXAMPLE

The same cotton woven fabric was treated under the same padding conditions as in the case of Example 3 with an aqueous dispersion which contained the same emulsifier as in the case of Example 1 and an amino-functional organopolysiloxane. The organopolysiloxane had about the same viscosity as the organopolysiloxane according to the invention which was obtained according to Example 1. This polysiloxane used for comparison contained primary amino groups in side chains of the polysiloxane, but the siloxane contained no triazine rings.

Evaluation of the treated cotton woven fabric:
  The woven fabrics obtained according to Example 3 and according to the comparison example were compared with one another in respect of handle and permanence of the effects in respect of handle. It was found that the handle without prior washing of the woven fabric in the case of Example 3 was about the same as that in the case of the comparison example. However, after only one wash (40° C., domestic washing machine with detergent added), it was found that the woven fabric treated with the polysiloxane according to the invention had a delectably softer handle than the woven fabric of the comparison example. This difference increased as the number of washes increased.

We claim:

1. An organopolysiloxane having the structure

A-E-A in which

E represents a divalent radical of the general formula (I)

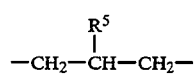
(I)

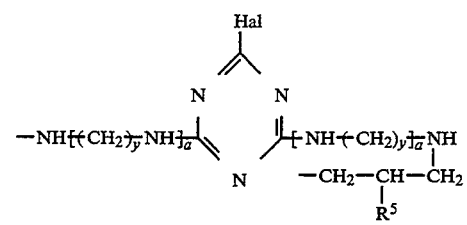

in which Hal represents Cl or F, y is in each case a number from 2 to 4 and a is in each case 0 or 1, in which the radicals A independently of one another represent a monovalent radical of the general formula (II)

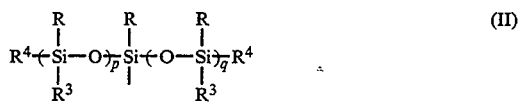
(II)

in which p is a number from 0 to 800, q is a number from 0 to 800 and p+q is a number from 15 to 800, in which all the radicals $R^3$ present independently of one another in each case represent a radical R or -E-A or

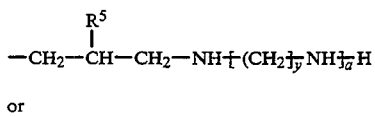

or

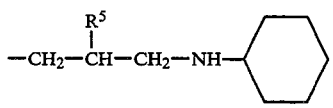

or

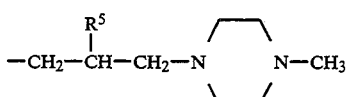

or

in which z is a number from 5 to 25, in which all the radicals R independently of one another represent an alkyl radical having 1 to 4 C atoms or the phenyl radical, $R^4$ represents $-OSiR_2R^1$ or R, in which $R^1$ represents R, OR or OH, and in which all the radicals $R^5$ present independently of one another represent H or $CH_3$.

2. An organopolysiloxane as claimed in claim 1, in which all the radicals R present are methyl radicals.

3. An organopolysiloxane as claimed in claim 1, in which 80 to 100% of all the radicals $R^3$ present are R.

* * * * *